Sept. 14, 1954   F. K. H. NALLINGER   2,689,015
AXLE SUSPENSION FOR MOTOR VEHICLES
Filed Jan. 19, 1951
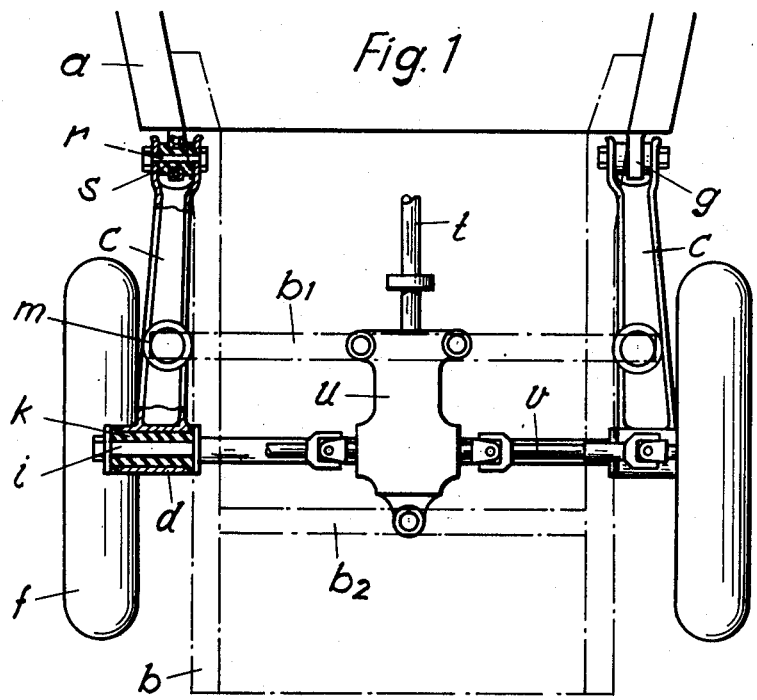
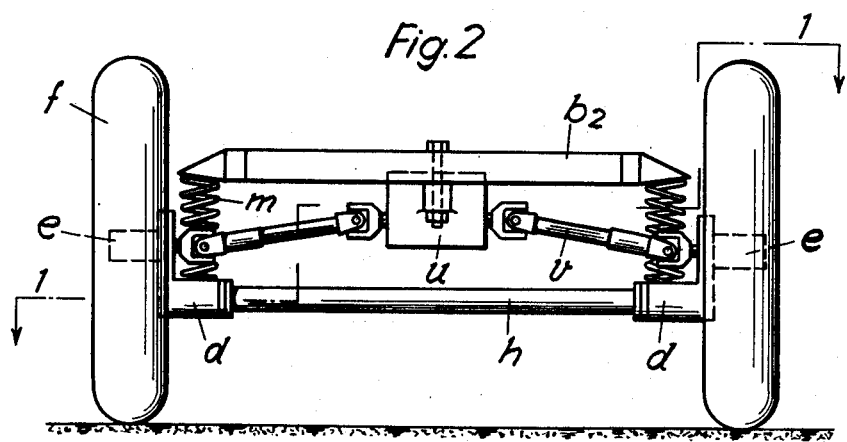
INVENTOR
FRIEDRICH K. H. NALLINGER.
BY Dicke and Padlon
ATTORNEYS.

Patented Sept. 14, 1954

2,689,015

UNITED STATES PATENT OFFICE 2,689,015

AXLE SUSPENSION FOR MOTOR VEHICLES

Friedrich K. H. Nallinger, Stuttgart, Germany, assignor to Daimler-Benz Aktiengesellschaft, Stuttgart-Unterturkheim, Germany Application January 19, 1951, Serial No. 206,759

4 Claims. (Cl. 180—73)

1

This invention relates to an axle suspension for motor vehicles with link members yieldingly linked to the sides of the chassis (frame or vehicle body) and turnably guiding the wheel supports in essentially vertical longitudinal planes; and with an axle member which is connected with the wheel supports and link members in such a manner that together with the latter members it forms a system having relatively fixed angles, that it can turn relative to the chassis about a central longitudinal axis of the vehicle and permitting a reciprocal twisting of the wheel supports about a transverse axis of the vehicle.

It will now be observed that such an axle suspension is not only extremely simple in construction but also permits all movements between axle and frame or vehicle body necessary for an irreproachable springing of the vehicle, in that the axle with the wheels may as well carry out springing motions acting in the same direction as, for example, in driving over a ridge extending across the road, as also springing motions acting in unequal or opposite directions as, for example, in driving over inequalities of the road. Separate guide means for the reception of transverse forces and for preventing sideways movement of the axle with respect to the frame or vehicle body are rendered unnecessary due to the angular rigidity of the axle system. On the other hand, the flexible articulation of the links to the vehicle superstructure (respectively a correspondingly yielding conformation of the links) as well as the fact that the axle member is formed to be torsionally flexible with respect to the wheel supports assures that the axle may move into an oblique position relative to the vehicle superstructure. In addition, such an axle suspension, due to its simple construction, has the advantage that the unsprung weight of the axle can be made very low. Also with respect to space the axle is well adapted for its purpose and fits the vehicle construction.

The present invention contemplates the application of such axles to driven wheels. Accordingly, a feature of the invention consists essentially in so mounting the axle drive gearing that it is suspended on the vehicle superstructure independently of the axle which is constructed in accordance with the foregoing features. Most desirably the wheels are driven by articulated drive shafts.

According to another feature of this invention the axle member—which, for example, is formed as a straight tubular member, which is yieldingly connected to the wheel supports or is itself formed to have torsional springiness, is disposed lower

2 than the wheel centers below the axle drive gearing, which, for example, is secured to the vehicle superstructure by means of rubber bumpers.

By a combination of these features it is assured that the advantages of the axle suspension—to which the teachings of the present invention are particularly applicable especially with respect to the simple construction and extremely low unsprung weight—are also retained when the invention is applied to driven wheels.

By suspending the drive gearing on the vehicle superstructure the difficulties, such as could occur by mounting the drive gearing to the axle and which would be prejudicial to simplicity and efficiency, can be substantially eliminated.

In the acompanying drawings which illustrate one of the preferred embodiments of the invention:

Fig. 1 represents a top plan view of the rear end of the chassis of a motor vehicle, illustrating some of the parts partially in section taken on the line 1—1 of Fig. 2, and Fig. 2 is an end view of the chassis as seen from the rear.

The wheels $f$ are pivotally guided on the frame $a$ provided with rear side rails $b$ by means of links $c$ which, for example, are integral with the wheel supports $d$. These supports carry the wheel axles $e$ which in turn carry the wheels $f$. The links $c$ are articulated to the frame by means of joints $g$ and interposed resilient bumpers $s$ in a manner permitting the links $c$ and link pins $r$ fastened therein to have universally flexible play as to the frame. The two wheel supports $d$ are connected to each other by means of a straight tubular axle member $h$ whose ends $i$ in the form of pins are supported in the wheel supports $d$ by means of rubber bushings $k$. Coil springs $m$ are employed for springing the axle.

The road wheels are driven by the drive shaft $t$ which on its part is driven by an engine, for example, arranged in the forward portion of the car. The axle drive gearing $u$, including the differential gearing, is mounted in known manner, for example, by the interposition of resilient bumpers on the cross-members $b_1$, $b_2$, or otherwise on the frame, or on the vehicle body, for example, at three or four points, and drives the wheels by means of articulated shafts $v$. The articulated shafts are each permitted to perform a certain longitudinal movement, for example, in each of the joints.

In equal upward springing motions of both wheels the links $c$ turn simultaneously about the axis of the joints $g$ without twisting of the axle system comprising links c and axle member h. In unequal or opposite springing motions the wheel supports d are twisted relative to each other by twisting of the rubber bushings k, or axle member h, the latter in corresponding torsionally flexible conformation. The axle drive gearing u does not take part in this movement. The difference in movement between axle and frame caused by the rebound or twisting of the axle system is compensated for by the articulated drive shafts v.

The application of the axle suspension as embodied in the invention is not limited or restricted to the form illustrated and described herein, but may be applied to any form of vehicle. The inventive concept may be applied to front axles as well as rear axles. The engine may also form a mutual drive aggregate for front-wheel drive or rear engine drive.

What is claimed is:

1. An axle suspension for motor vehicles comprising a chassis, a pair of road wheels disposed opposite each other, a link member for each of said two road wheels, yielding means pivotally connecting one end of each link member to said chassis for movement about an axis extending transversely to the driving direction, a wheel support for each of said two wheels connected to the other ends of said links, an undivided axle member independent of said chassis, means including said axle member for connecting said two wheel supports to retain said wheel supports immovable relative to each other in the direction of said axle member and to provide a relative movement of said links with respect to each other around a transverse axis of the vehicle whereby said links together with said wheel supports and said axle member form a system having essentially fixed angles, said axle member being permitted to generally swing about a central longitudinal axis extending in the driving direction relative to said chassis, and said wheel supports being arranged to turn relative to each other about an axis extending transversely to said driving direction, and driving means independent of said axle member for driving said road wheels.

2. Axle suspension according to claim 1, wherein said means for connecting said two wheels supports further includes resilient means.

3. Axle suspension according to claim 1 wherein said axle member is formed to be torsionally flexible.

4. Axle suspension according to claim 1 wherein said axle member connecting said wheel supports is situated lower than the axis of said wheels and wherein said driving means is located above said axle member.

References Cited in the file of this patent

UNITED STATES PATENTS

| Number | Name | Date |
|---|---|---|
| 1,405,763 | Dargert | Feb. 7, 1922 |
| 1,946,948 | Roos | Feb. 13, 1934 |
| 2,129,232 | Paton | Sept. 6, 1938 |
| 2,190,279 | Zimka et al. | Feb. 13, 1940 |
| 2,256,069 | Wagner | Sept. 16, 1941 |
| 2,367,817 | Brown | Jan. 23, 1945 |

FOREIGN PATENTS

| Number | Country | Date |
|---|---|---|
| 493,412 | Great Britain | Oct. 7, 1938 |